Oct. 15, 1929.  A. F. GILLET  1,731,851
TRACTION CHAIN
Filed Feb. 2, 1929  2 Sheets-Sheet 1

Inventor
A. F. Gillet
By Arthur H. Sturges
Attorney

Inventor
A. F. Gillet
By Arthur H. Sturges
Attorney

Patented Oct. 15, 1929

1,731,851

UNITED STATES PATENT OFFICE

ALEXIS F. GILLET, OF OMAHA, NEBRASKA, ASSIGNOR TO JUBILEE MANUFACTURING COMPANY, OF OMAHA NEBRASKA, A CORPORATION OF NEBRASKA

TRACTION CHAIN

Application filed February 2, 1929. Serial No. 337,049.

The present invention relates to anti-skid traction chains for tires, and more particularly to the type known as cross chains.

This invention has for an object to improve the device shown in my co-pending application Serial No. 324,862, filed December 10, 1928, for anti-skid chain.

An object of the invention is to provide a traction chain for vehicle wheels, wherein the tension of the chain is utilized by a peculiar construction for holding the chain in an operative position and from accidental displacement, and which, when in position, will remain upon the wheel.

Another object of the invention is to provide a construction of traction cross chain, which, when in position, is prevented from having sliding movements transversely of the perimeter of the wheel.

A still further object of the invention is to provide a traction cross chain for the tires of vehicle wheels embodying the above features and which is provided with locking or securing means so positioned upon the structure that it may be placed at the outer side of the vehicle wheel, so that easy access may be had to the attachment for locking it in position and for releasing it when it is desired to remove the chain.

A primary object of the invention is to provide a cross chain structure embodying the foregoing features and in addition thereto to provide a means whereby the cross chain after becoming slack or acquiring a stretched and lengthened condition through use will be prevented from becoming detached from the wheel.

A further object of the invention is to provide a locking device for the chain structure and having connecting means between the locking device and the free end of the cross chain for admitting of the easy and quick removal and connection of the free end of the chain with respect to the locking device, such connections being disposed at the side of the wheel and remote from the perimeter thereof, so that the coupling and operating devices of this invention are disposed above the surface of the roadway, and consequently above the sand, snow, mud and the like in which the wheel may be embedded.

Another object of the invention is to provide a structure, the cross chain of which may be totally and readily removed from its mounting upon its locking means when said chain becomes unduly worn and replacement thereof is desired.

The invention will be more fully described hereinafter wherein other objects and advantages are more particularly pointed out and claimed.

In the drawings, wherein like symbols refer to like or corresponding parts throughout the several views, Figure 1 is a transverse section taken through a portion of the tire as applied to a vehicle wheel and having an anti-skid traction device constructed according to this invention applied thereto, the dotted lines showing the device in released position.

Figure 1:
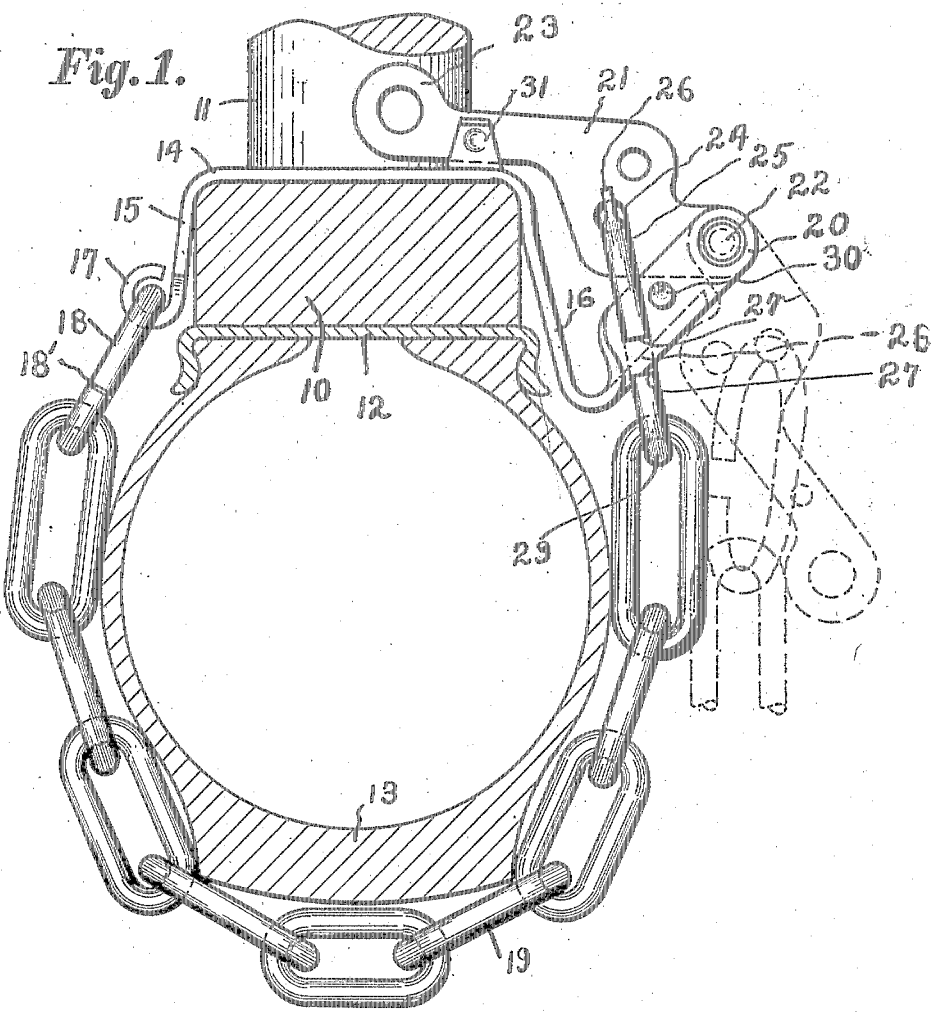

Referring to the drawing, the wheel is shown fragmentarily and as a felly 10, spoke 11 and a rim 12. These parts may be of any conventional form, the rim 12 carrying a tire 13.

The traction device of this invention comprises a saddle plate 14 of any suitable width or strength and is preferably adapted to extend between the adjacent spokes 11 and across the inner face of the felly 10 and may be arranged to engage a spoke 11 if desired. The saddle plate 14 is preferably provided with arms 15 and 16, which are bent outwardly from the intermediate portion of the plate 14 and which lie at opposite sides or edges of the felly 10 to hold the saddle plate from sliding transversely across the felly. The arm 15 terminates adjacent to and preferably inwardly of the rim 12 and may be reduced and rolled over to provide an eye 17 in which is pivotally and permanently connected a chain link 18, the latter preferably being provided with an opening 18' for purposes later described. An end link of the cross chain 19 is removably connected to the chain link 18 by closing the opening 18'. The chain 19 is made up of a plurality of links of any desired length and shape and in the present instance straight links are shown which are of reduced length at the tread portion of the tire, and are preferably of increased length at the opposite sides of the tire 13. The arm 16 of the saddle plate 14, which may be termed the outer arm, is preferably formed of greater length than that of the arm 15, and is preferably provided with a pair of outwardly extending ears 20, which may be formed integral with the free end of the arm 16, and bent or twisted at substantially right angles to provide a pair of spaced flat ears for pivotally supporting therebetween the outer end of a locking lever 21. The locking lever 21 is mounted at its outer end on a pivot 22, which extends through the ears 20, the pivot 22 being located near the outer ends of the ears remote from the arm 16, while the locking lever is provided with an angular heel portion, which lies substantially in parallel relation between the ears 20, and extends upwardly along the outer side of the arm 16 for displacing the intermediate portion of the locking lever 21 inwardly toward the felly 10 from the pivot 22.

Figure 2:
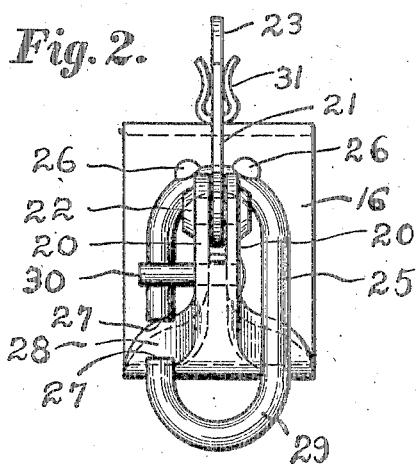
Figure 2 is a fragmentary outer-side elevation of the device removed from the wheel and showing retaining means in locked position and the detent for the retaining means.

The free end of the locking lever 21 is preferably curved inwardly across the saddle plate 14 and extends to any desired extent. The free extremity of the locking lever 21 is enlarged and apertured to provide a handle 23 for engagement by the hand or by a suitable implement, which may be passed through the opening in the handle for the purpose of swinging the locking lever 21 outwardly from the saddle plate 14. The intermediate portion of the locking lever 21 is provided with an opening 24 forming a bearing through which engages one end of a hook-link 25. The said end of the link 25 is freely rotatable in the opening 24 of the locking lever, and is retained in engagement therewith and prevented from transverse sliding movements therewith by stop projections 26, which are preferably swaged upwardly from the body of the hook-link 25 at opposite sides of the locking lever 21. The link 25 is incised at one of its sides thereby forming terminal ends 27 between which a gap 28 is thus provided and the free end 29 of the link 25 thus provides a hook, which is normally open, but which is blocked by the ears 20 when the connecting or coupling hook-link 25 is raised in a closed position, such as shown in Figures 1 and 2.

A detent or lug 30 is formed upon an ear 20 of the arm 16 by any suitable means such as riveting a pin through the ears 20. The diameter of the detent 30 is slightly less than the distance across the opening or gap 28 of the hook-link 25 in order that the hook-link 25 may be freely movable past the detent 30 at desired times.

The link 25 being connected to the intermediate portion of the locking lever 21 is swung upwardly beyond the pivot 22 when in securing position so that pressure on the hook-link 25 outwardly toward the tread of the tire results in the binding and retention of the locking lever 21 in its closed position when pressure is applied to the hook-link from the chain 19 when the latter contacts with the road-way during the operation of the vehicle wheel.

In operation the cross chain 19 is taut at all times while making contact with the roadway but the said chain becomes comparatively slack when not making said contact especially when a device of a large size or diameter is erroneously placed about a small tire. Under such conditions the lever 21 could become displaced and swing outwardly away from the tire and the chain 19 become detached from the hook-link 25 and the device become lost. In order to prevent such a result the detent or lug 30 is provided for preventing an outward swinging movement of the hook-link 25, the latter in turn preventing an outward swinging movement of the lever 21.

While the pressure exerted upon the cross chain 19 is sufficient in holding the locking lever 21 in locked position, as shown in Figure 1, and the detent 30 is sufficient in holding the locking lever in the desired position when the pressure is removed, additional means may be provided for holding the locking lever in its locked position. This additional means is a spring clip 31 which is secured upon the inner face of the saddle plate 14 preferably near the arm 16 and which is provided with spring arms arranged to frictionally engage the opposite sides of the locking lever 21 and hold it frictionally against movement away from the saddle plate.

To remove the device the lever 21 is moved upwardly and swung outwardly, the operator causing the terminal ends 27 of the hook-link 25 to pass the detent 30 by means of making the proper adjustments with his fingers.

To apply the device to a wheel it is only necessary to place the saddle plate 14 in position on the felly and draw the cross chain 19 around the tread of the tire 13, the application being made at a point upon the wheel which is above the mud or snow. The last link of the chain 19 at its normally free end is now engaged with the hook-link 25 and the locking lever 21 is then swung upwardly into the dotted line position shown in Figure 3 from its down position shown in Figure 1.

Figure 3:
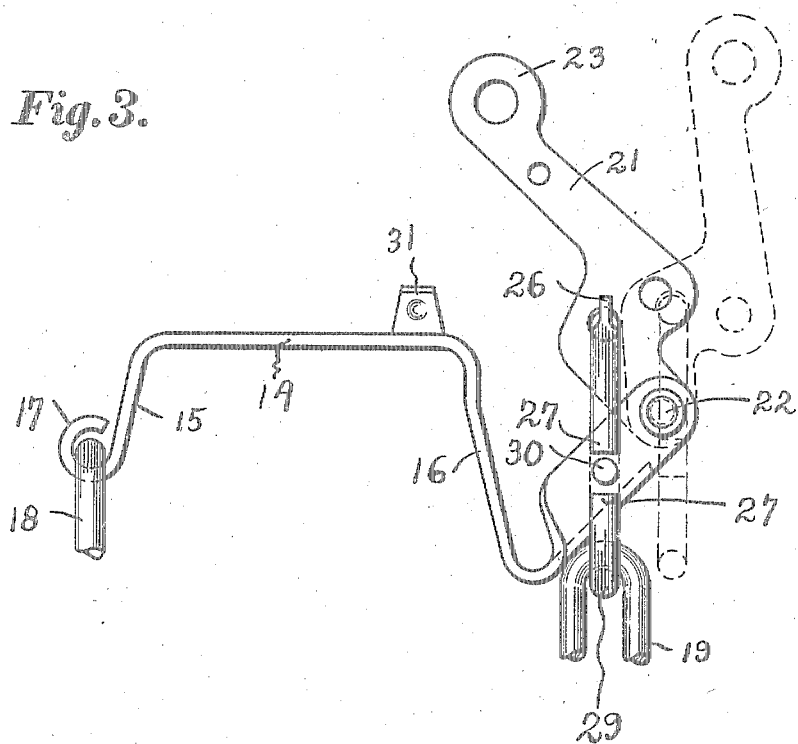
Figure 3 is a fragmentary side view of the device removed from the wheel and showing a retaining means passing the detent, the dotted lines showing the relative position of the parts prior to said parts assuming their full line positions.
Figure 4:
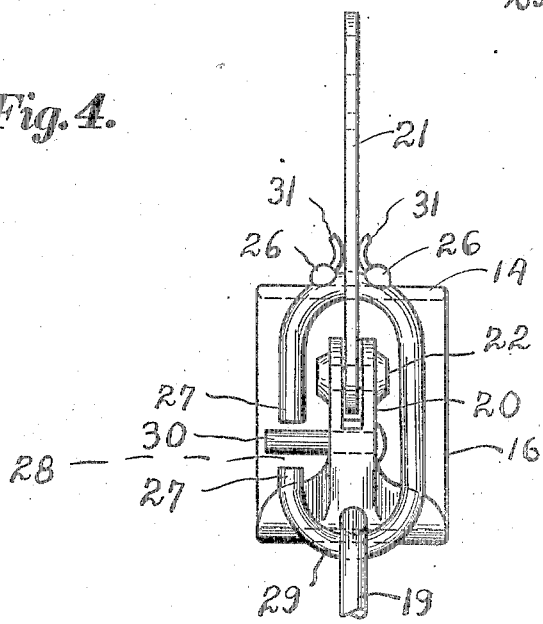
Figure 4 is a side elevation of the positions of the device shown by the full lines in Figure 3.

The locking lever 21 is now swung into its full line position shown in Figure 3 thereby permitting the terminal ends 27 of the hook-link 25 to pass by its detent 30. The lever 21 is now moved downwardly towards the saddle plate 14 until it assumes the full line position shown in Figure 1, the gap 28 between the terminal ends 27 of the hook-link 25 now being below the detent 30. At this time the hook-link 25 is thus engaged over the ears 20, said ears thereby substantially filling the hook-link and preventing the free end of the chain 19 from moving upwardly and becoming detached from the hook-link.

From the above description it is evident that the pressure exerted against the cross chain is utilized in holding the locking lever 21 seated against the saddle plate 14. The locking lever 21 as it is seated, engages between the arms of the clip 31 and the clip thus grips the locking lever and holds it against abrasion and normal displacement causes. It will also be noted that the structure and location of the locking lever 21 is such that the jolts or shock imparted to the wheel will only tend to more firmly seat the locking lever in closed position, and the rapid turning of the wheel will only result in a centrifugal thrust which will further tend to maintain the lever locked.

When the cross chain 19 becomes unduly worn and it is desired to renew it the eye 17 of the arm 15 of the saddle plate may be opened and a new chain attached to the saddle plate.

While I have shown and described the preferred embodiment of the invention, I do not desire it to be understood as limiting myself to the precise details of construction herein shown and delineated, as modifications and minor changes may be made within the scope of the appended claim.

I claim:—

In an anti-skid tire chain comprising a saddle plate adapted to fit across the felly and having outturned arms adapted to lie against the opposite edges of the felly, a tire chain pivotally connected to one of said arms and adapted to engage about a tire on the felly, the other arm of said saddle plate having outwardly extending elongated ears, a locking lever having an angle heel portion extending between the ears, a pivot between the outer ends of the ears and the outer end of the heel portion, and a hook link pivotally mounted upon the intermediate portion of the locking lever adjacent the inner end of the heel portion and adapted to be swung into position over the ears and into position outwardly of the ears, by the pivoting movement of said locking lever, said hook link having an opening in its side to permit a link of the tire chain to pass therethrough, said opening being situated in the hook link with respect to the ears whereby in the closed position the opening will be blocked by such ears to avoid the escape of said link of the tire chain in the event of too loose an application of the tire chain to the tire, means for preventing disengagement of the hook and chain comprising a detent mounted on the second mentioned arm and adapted to engage the hook during swinging movements when the lever is in the closed position and adapted to register with the opening in the hook when the lever is swung to open position.

In testimony whereof, I have affixed my signature.

ALEXIS F. GILLET.